United States Patent
Chen

(10) Patent No.: US 7,899,126 B2
(45) Date of Patent: Mar. 1, 2011

(54) SIGNAL RECEIVER AND METHOD FOR ESTIMATING RESIDUAL DOPPLER FREQUENCIES OF SIGNALS THEREOF

(75) Inventor: Kun-Tso Chen, Chang-Hua Hsien (TW)

(73) Assignee: Mediatek Inc., Hsin-Chu (TW)

( * ) Notice: Subject to any disclaimer, the term of this patent is extended or adjusted under 35 U.S.C. 154(b) by 846 days.

(21) Appl. No.: 11/829,231

(22) Filed: Jul. 27, 2007

(65) Prior Publication Data

US 2009/0028223 A1 Jan. 29, 2009

(51) Int. Cl.
*H04K 1/10* (2006.01)
*H04L 27/28* (2006.01)

(52) U.S. Cl. .................. 375/260; 375/130; 375/261

(58) Field of Classification Search .............. 375/260, 375/148, 220, 261, 296, 298, 299
See application file for complete search history.

(56) References Cited

U.S. PATENT DOCUMENTS

| | | | |
|---|---|---|---|
| 6,272,174 B1 | 8/2001 | Murphy | |
| 6,952,440 B1 | 10/2005 | Underbrink | |
| 6,959,057 B1 | 10/2005 | Tuohino | |
| 6,970,577 B2 | 11/2005 | Han | |
| 6,975,673 B1 | 12/2005 | Rouquette | |
| 7,006,556 B2 | 2/2006 | Abraham et al. | |
| 7,027,486 B2 | 4/2006 | Sullivan | |
| 7,027,534 B2 | 4/2006 | Sahai et al. | |
| 7,042,930 B2 | 5/2006 | Dafesh | |
| 7,046,194 B2 | 5/2006 | Dooley et al. | |
| 7,065,629 B2 | 6/2006 | Warloe et al. | |
| 7,099,378 B2 | 8/2006 | Dunyak et al. | |
| 7,110,782 B2 | 9/2006 | Yamaguchi | |
| 2005/0168382 A1* | 8/2005 | Awata | 342/357.02 |
| 2006/0095206 A1* | 5/2006 | Garin et al. | 701/213 |
| 2008/0151971 A1* | 6/2008 | Mo et al. | 375/150 |
| 2008/0181057 A1* | 7/2008 | Chamberlain et al. | 367/76 |
| 2008/0252512 A1* | 10/2008 | Demaj | 342/104 |
| 2009/0130988 A1* | 5/2009 | Goldberg | 455/73 |

* cited by examiner

*Primary Examiner*—Chieh M Fan
*Assistant Examiner*—Qutbuddin Ghulamali
(74) *Attorney, Agent, or Firm*—Thomas|Kayden

(57) ABSTRACT

The invention provides a signal receiver. The signal receiver comprises a code removal module, a carrier removal module, a Fast Fourier Transformation (FFT) module, and a signal processor. The code removal module removes a pseudo random noise code from a first signal to obtain a second signal. The carrier removal module generates a carrier signal with a frequency of an estimated carrier frequency, generates at least one delta carrier signal with a frequency of the carrier frequency plus a delta frequency, removes the carrier signal from the second signal to obtain a third signal, and removes the delta carrier signal from the second signal to obtain a fourth signal. The FFT module derives a series of first FFT values from the third signal, and derives a series of second FFT values from the fourth signal. The signal processor estimates the carrier frequency of the second signal to obtain the estimated carrier frequency, determines the delta frequency for the carrier removal module, estimates a residual Doppler frequency of the third signal according to both the first FFT values and the second FFT values, and adjusts the estimated carrier frequency according to the residual Doppler frequency to eliminate distortion from residual Doppler effects from the third signal. The delta frequency is lower than a frequency resolution of the FFT module.

23 Claims, 9 Drawing Sheets

SIGNAL RECEIVER AND METHOD FOR ESTIMATING RESIDUAL DOPPLER FREQUENCIES OF SIGNALS THEREOF

BACKGROUND OF THE INVENTION

1. Field of the Invention

The invention relates to signal processing, and more particularly to Fast Fourier Transformation (FFT) of signals.

2. Description of the Related Art

When a Global Positioning System (GPS) receiver receives a GPS signal, the GPS signal is first amplified and filtered. The GPS receiver then attempts to estimate a Doppler frequency shift of the GPS signal with a carrier tracking loop, and lock a code phase of the GPS signal with a code tracking loop. If the satellite sending the GPS signal is moving, the motion of the satellite causes a Doppler frequency shift, which must be adequately compensated before data is extracted from the GPS signal. Additionally, because the satellite combines data carried by the GPS signal with a pseudo random noise (PRN) code before signal transmission, the GPS receiver must track the code phase of the PRN code of the satellite to extract data from the GPS signal.

In one method for estimating the residual Doppler frequency of a received signal, after a carrier signal is removed from a GPS signal, the GPS signal is first delivered to a correlation module which removes the PRN code from the GPS signal. An FFT module then performs a Fast Fourier Transformation (FFT) on the GPS signal to obtain a series of FFT values, according to which the residual Doppler frequency is estimated. Because the estimation is based on FFT values derived from a GPS signal subsequent to correlation processing, the estimation method is referred to as "post-correlation FFT" estimation.

FIG. 1 is a block diagram of a GPS receiver 100. A radio-frequency GPS signal is received by an antenna 102 of the GPS receiver 100. The GPS signal is then amplified by the pre-amplifier 104. A down converter 106 then implements a down conversion on the GPS signal, and an analog to digital converter then converts the GPS signal from analog to digital. The digital GPS signals $S_{ch1} \sim S_{chN}$, each of which corresponds to a satellite channel transmitting signal, are then respectively delivered to corresponding channel processing modules 111~11N to implement the carrier tracking loop and code tracking loop, and signals $S_{ch1}' \sim S_{chN}'$, without carrier and PRN code, are obtained. The signals $S_{ch1}' \sim S_{chN}'$ are then delivered to a signal processor 120 for extraction of data therefrom.

FIG. 2 is a block diagram of a code removal module 200 of a channel processing module. The channel processing module processes a GPS signal S of a specific satellite channel, and the code removal module 200 removes the PRN code from the GPS signal S. A sine table 202 and a cosine table 204 respectively generate sine values and cosine values according to a carrier number-controlled oscillator 242. The signal S is then multiplied by the sine values and the cosine values to respectively obtain an in-phase signal I and a quadrature signal Q.

The in-phase signal I and the quadrature signal Q are then delivered to a correlation module 210 of the code removal module 200. A PRN code generator 238 first generates three PRN code signals with the same phase difference therebetween, including an early code E, a prompt code P, and a Late code L. A plurality of multipliers 212~216 and 222~226 of the correlation module 210 then respectively multiply the in-phase signal I and the quadrature signal Q by the early code E, the prompt code P, and the Late code L to obtain a plurality of products. The products are then delivered to a summation module 220 of the code removal module 200. A plurality of accumulators 231~236 of the summation module 220 repeatedly accumulate the corresponding products for a predetermined sampling period to obtain a plurality of series of samples IE, IP, IL, QE, QP, and QL. A dump counter 240 triggers the accumulators 231~236 to dump the accumulation values therefrom.

FIG. 3 is a schematic diagram of a signal processing course of post-correlation FFT estimation. As previously mentioned, before a FFT is performed on a received signal to obtain FFT values for estimation, a signal carrier carrying data of the signal and a PRN code mixed with the data must be removed from the signal. Thus, a signal $S_0$ is first delivered to a carrier removal module 302 for removal of the signal carrier therefrom. An oscillator 332 generates a carrier signal A with an estimated carrier frequency $f_{carrier}$. A phase rotator 313 rotates the phase of the carrier signal A by 90° to obtain a carrier signal A'. Two multipliers 312 and 322 then respectively multiply the signal $S_0$ by the carrier signals A and A' to obtain signals $S_{1I}$ and $S_{1Q}$. Two low pass filters 314 and 324 then respectively remove high-frequency signal components from the signals $S_{1I}$ and $S_{1Q}$ to obtain signals $S_{2I}$ and $S_{2Q}$ without signal carriers.

The signals $S_{2I}$ and $S_{2Q}$ are then delivered to a code removal module 304 removing a PRN code from the signals. The code removal module 304 has a similar structure to the code removal module 200 of FIG. 2. A code generator 334 generates a PRN code B, and two multipliers 316 and 326 of a correlation module multiply the signals $S_{2I}$ and $S_{2Q}$ by the PRN code B to obtain signals $S_{3I}$ and $S_{3Q}$ without PRN codes. Two integration and dump modules 318 and 328 then repeatedly integrate the signals $S_{3I}$ and $S_{3Q}$ for a duration T and dump the integration values $Y_I$ and $Y_Q$ to buffers 319 and 329. The buffers 319 and 329 temporarily hold the integration values $Y_I$ and $Y_Q$.

The integration values $Y_I$ and $Y_Q$ are used as input samples of a FFT module 308. Each corresponding pair of the integration values $Y_I$ and $Y_Q$ forms a FFT input sample Y with a real part $Y_I$ and an imaginary part $Y_Q$. Because the integration period is T, the sampling frequency of the FFT input samples Y is 1/T. An FFT point number of the FFT module 308 is assumed to be M. Thus, after the FFT module 308 performs a FFT on samples $Y_0 \sim Y_{M-1}$ of time domain, a plurality of FFT values $Z_0 \sim Z_{M-1}$ of frequency domain are obtained. A signal processor can then estimate a residual Doppler frequency according to the FFT values $Z_0 \sim Z_{M-1}$.

Because the locally estimated carrier frequency $f_{carrier}$ is not identical to a true carrier frequency of a satellite transmitting the signal, the residual Doppler frequency, which is the difference between the locally estimated carrier frequency $f_{carrier}$ and the true carrier frequency, causes signal distortion and affects data extraction and processing, referred to as a residual Doppler effect. The residual Doppler effect can be eliminated by estimating the residual Doppler frequency and adjusting the estimated carrier frequency according to the estimated residual Doppler frequency. Because the signal carrier and the PRN code have been removed from the signals $S_{3I}$ and $S_{3Q}$, the residual Doppler frequency takes effect in the form of a continuous sinusoidal wave mixed in the signals $S_{3I}$ and $S_{3Q}$ with a frequency of the residual Doppler frequency. Because only a finite segment of the signal $S_3$ is sampled as the input samples of the FFT module 308, the continuous sinusoidal wave with the residual Doppler frequency is converted into a sinc function shown in a signal spectrum diagram of the FFT values Z derived from the signal $S_3$, wherein the center frequency of the sinc function is the residual Doppler frequency. Thus, the residual Doppler frequency can be estimated according to the FFT values Z.

FIG. 4A is a signal spectrum diagram of FFT values for residual Doppler frequency estimation. A dotted line shows signal degradation of residual Doppler effect. A solid line shows signal spectrum of the continuous sinusoidal wave with a frequency of a residual Doppler frequency, which is assumed to be 250 Hz in FIG. 4A. A time domain signal is converted into FFT input samples with a sampling frequency of 1000 Hz. A FFT module then performs FFT on the samples with a FFT point number of 20 to generate FFT values. Thus, the spectrum range of the FFT values is 1000 Hz, ranging from −500 Hz to 500 Hz. 20 FFT values obtained in one FFT conversion are shown in FIG. 4A according to the corresponding frequencies thereof in the form of circles. Among the 20 FFT values, an FFT value 402 corresponding to the frequency of 250 Hz coincides with the center frequency of the main lobe of the residual Doppler wave. Thus, in the case of FIG. 4A, the residual Doppler frequency can be easily estimated by simply locating a corresponding frequency of the FFT value 402 with a maximum magnitude among the FFT values.

FIG. 4B is a signal spectrum diagram of FFT values corresponding to a scalloping loss situation. A residual Doppler frequency does not always coincide with the frequency of one of the FFT values. If the frequencies of FFT values do not exactly match a residual Doppler frequency, the frequency corresponding to the FFT value with the maximum magnitude does not precisely predict the residual Doppler frequency, and scalloping loss occurs. For example, the residual Doppler frequency of FIG. 4B can be 225 Hz, which lies exactly halfway between the frequencies of the FFT values 412 and 414. The frequencies 200 Hz and 250 Hz respectively correspond to the FFT values 412 and 414 with the maximum magnitude, and therefore are not the exact residual Doppler frequency, differing by a frequency bias of 25 Hz therebetween. Thus, a method is provided to estimate a frequency bias between a frequency of the FFT values and a residual Doppler frequency.

FIG. 5 is a signal spectrum diagram of FFT values for estimating a frequency bias from scalloping loss. The residual Doppler frequency of FIG. 5 is 12.5 Hz. Three adjacent FFT values 502, 504, and 506 with maximum magnitudes are first selected from the 20 FFT values. Thus, the three adjacent FFT values 502, 504, and 506 form a magnitude peak roughly overlapping the signal spectrum of the main frequency slope of the residual Doppler wave, and the residual Doppler frequency can be estimated according to the three FFT values. The estimated residual Doppler frequency can be expressed as the frequency 0 Hz of the peak FFT value 504 with the maximum signal magnitude plus a frequency bias of 12.5 Hz. Because the frequency bias is substantially in proportion to the magnitude difference between the left FFT value 502 and the right FFT value 506, the frequency bias 12.5 Hz can be estimated according to the difference between the magnitudes 0.18 and 0.3 of the left FFT value 502 and the right FFT value 506. The estimated residual Doppler frequency is then obtained by adding the frequency of the peak FFT value 504 and the estimated frequency bias.

Precision of estimation of the residual Doppler frequency affects the accuracy of data extraction, further affecting subsequent data processing of the GPS receiver. Because frequency resolution of the FFT module is a factor in determining the estimation precision of the residual Doppler frequency, a higher frequency resolution is desirable. Although the FFT frequency resolution can be increased by increasing FFT point numbers of the FFT module, the increase of FFT point numbers extends a filling time of the FFT module, which indicates a period length of a segment of GPS signal required by the FFT module to generate a set of FFT values. In other words, there is a tradeoff between the frequency resolution and the filling time. The increase in filling time causes the liability of increased signal delay. Thus, a method for improving a frequency resolution of a FFT without increasing filling time is desirable for the estimation of a residual Doppler frequency.

BRIEF SUMMARY OF THE INVENTION

The invention provides a signal receiver. An embodiment of the signal receiver comprises a code removal module, a carrier removal module, a Fast Fourier Transformation (FFT) module, and a signal processor. The code removal module removes a pseudo random noise code from a first signal to obtain a second signal. The carrier removal module generates a carrier signal with a frequency of an estimated carrier frequency, generates at least one delta carrier signal with a frequency of the carrier frequency plus a delta frequency, removes the carrier signal from the second signal to obtain a third signal, and removes the delta carrier signal from the second signal to obtain a fourth signal. The FFT module derives a series of first FFT values from the third signal, and derives a series of second FFT values from the fourth signal. The signal processor estimates the carrier frequency of the second signal to obtain the estimated carrier frequency, determines the delta frequency for the carrier removal module, estimates a residual Doppler frequency of the third signal according to both the first FFT values and the second FFT values, and adjusts the estimated carrier frequency according to the residual Doppler frequency to eliminate distortion from residual Doppler effects from the third signal. The delta frequency is less than a frequency resolution of the FFT module.

The invention also provides a method for estimating a residual Doppler frequency in a signal receiver. First, a pseudo random noise code is removed from a first signal received by the signal receiver to obtain a second signal. A carrier frequency of the second signal is then estimated to obtain an estimated carrier frequency. At least one delta frequency is also determined. A carrier signal with a frequency of the estimated carrier frequency is then generated. At least one delta carrier signal with a frequency of the carrier frequency plus the delta frequency is also generated. The carrier signal is then removed from the second signal to obtain a third signal. The delta carrier signal is then also removed from the second signal to obtain a fourth signal. A first FFT is then performed to derive a series of first FFT values from the third signal. A second FFT is also performed to derive a series of second FFT values from the fourth signal. A residual Doppler frequency of the third signal is then estimated according to both the first FFT values and the second FFT values. Finally, the estimated carrier frequency is adjusted according to the residual Doppler frequency to eliminate distortion from residual Doppler effects from the third signal. The frequency resolutions of the first FFT and the second FFT are the same, and the delta frequency is less than the frequency resolution of the first FFT and the second FFT.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
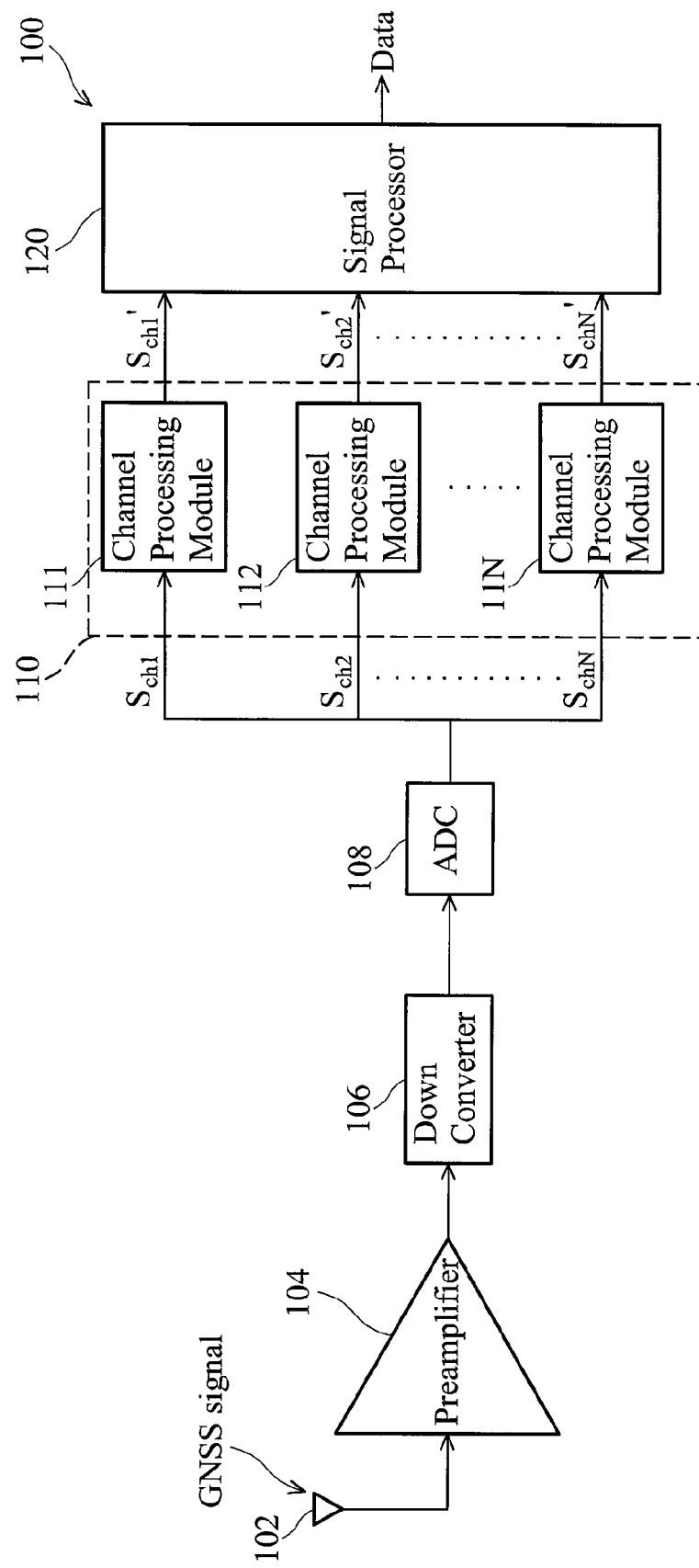
FIG. 1 is a block diagram of a GPS receiver.
Figure 2:
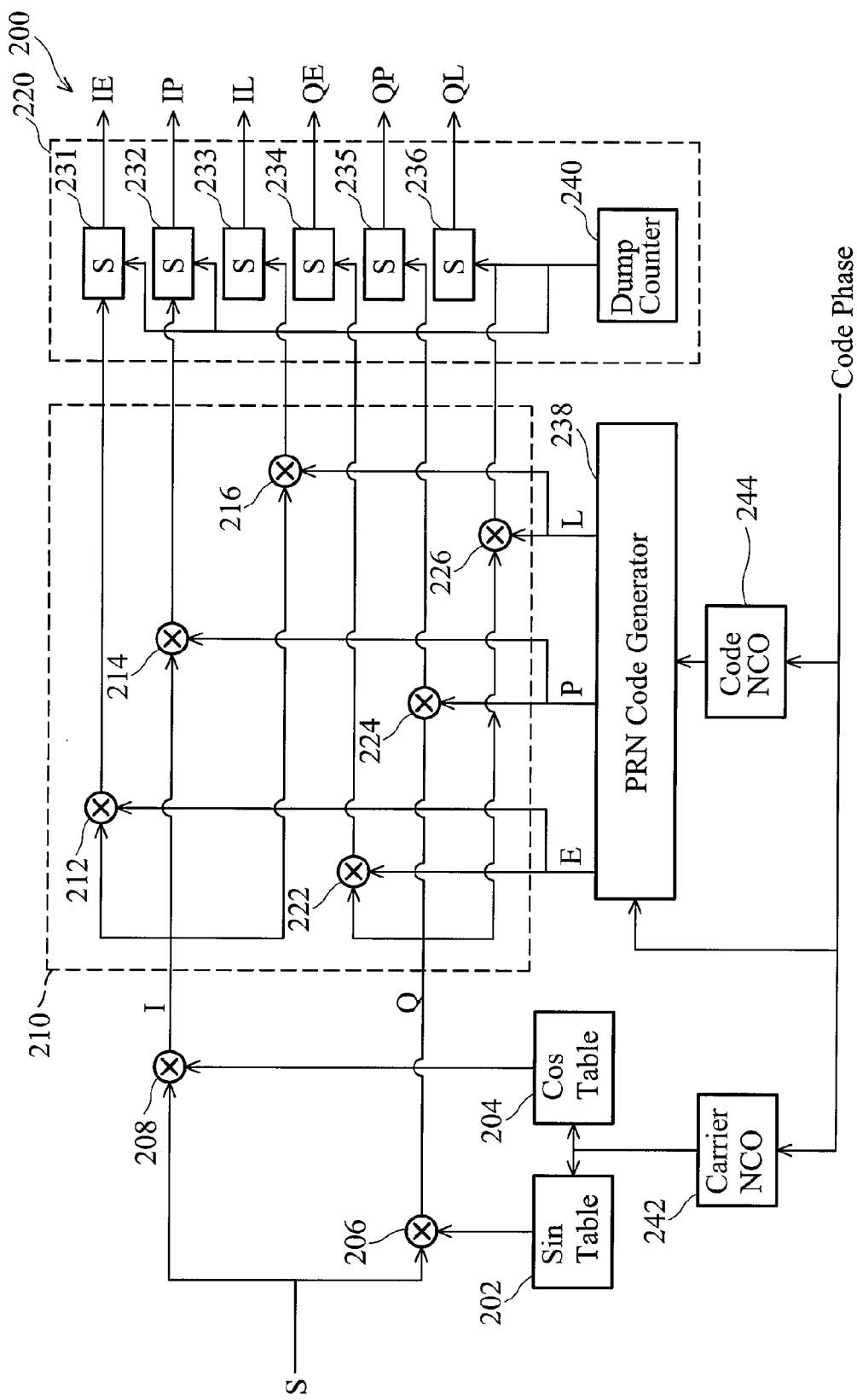
FIG. 2 is a block diagram of a code removal module of a channel processing module.
Figure 3:
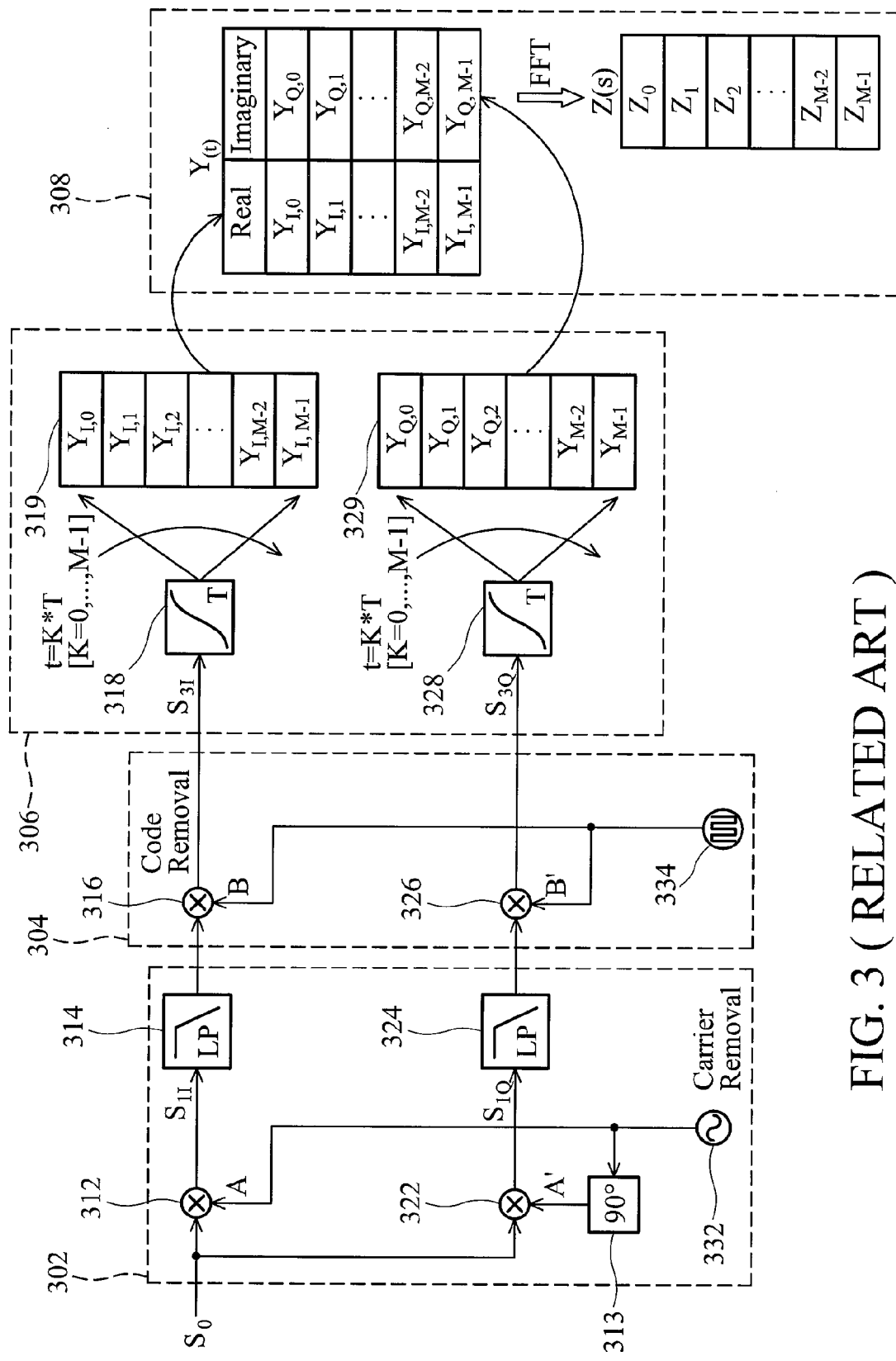
FIG. 3 is a schematic diagram of a signal processing course of post-correlation FFT estimation.
Figure 6:
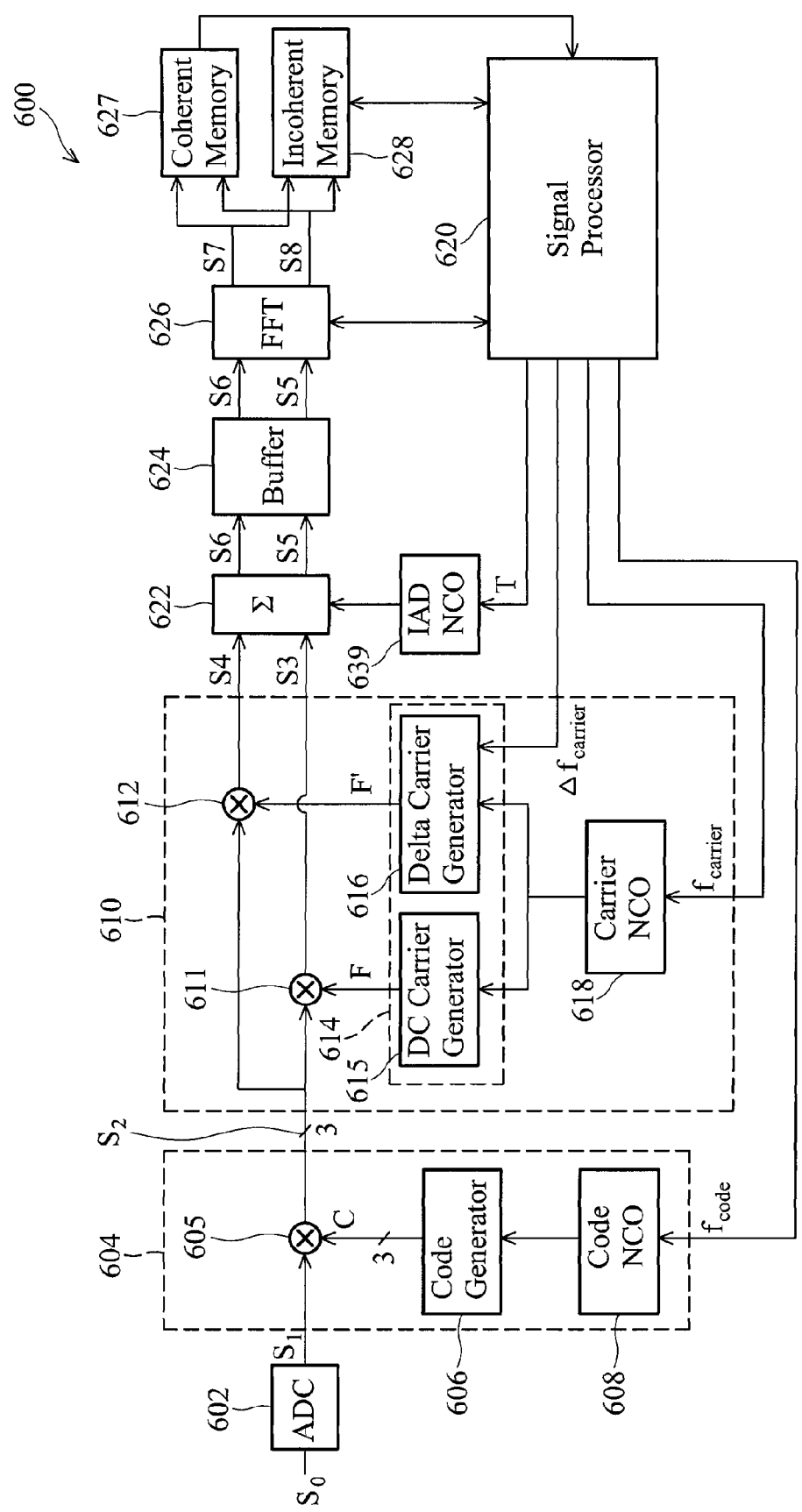
FIG. 6 is a block diagram of a signal processor with improved FFT resolution for estimating a residual Doppler frequency according to the invention.

FIG. 6 is a block diagram of a signal processor 600 with improved FFT resolution for estimating a residual Doppler frequency according to the invention. An analog to digital converter 602 first converts an analog signal $S_0$ to a digital signal $S_1$. A code removal module 604 then removes a PRN code from the signal $S_1$ to obtain a signal $S_2$, wherein the code removal module 604 includes a code generator 606 and a correlation module 605 and is substantially similar to the code removal module 200 of FIG. 2. The signal $S_2$ is then delivered to a carrier removal module 610. The carrier removal module 610 includes a carrier generator 615 generating a carrier signal F with a frequency equal to a carrier frequency $f_{carrier}$ estimated by a signal processor 620. The carrier removal module 610 also includes a delta carrier generator 616 generating a delta carrier signal F' with a frequency equal to the carrier frequency $f_{carrier}$ plus a delta frequency $\Delta f_{carrier}$.

The delta frequency $\Delta f_{carrier}$ is lower than a frequency resolution of a FFT module 626. For example, if N is a FFT point number of the FFT module 626, and T is a sampling period of the input samples of the FFT module 626, the frequency resolution of the FFT module is $1/(N \times T)$, and the delta frequency $\Delta f_{carrier}$ must be lower than the frequency resolution $1/(N \times T)$. In one embodiment, a plurality of delta frequencies have different values of $J/[(k+1) \times (N \times T)]$, wherein k is a number of the delta frequencies and is greater than or equal to 1, and J is an index of the delta frequencies and ranges from 1 to k. Thus, if there is only one delta frequency, k is equal to 1, and the delta frequency $\Delta f_{carrier}$ is $1/[2 \times (N \times T)]$, and the delta carrier generator 616 generates a delta carrier signal F' with a frequency equal to the carrier frequency $f_{carrier}$ plus the delta frequency of $1/[2 \times (N \times T)]$. Two multipliers 611 and 612 then respectively remove the carrier signal F and the delta carrier signal F' from the signal $S_2$ to respectively obtain signals $S_3$ and $S_4$.

A summation module 622 then respectively accumulates samples of the signals $S_3$ and $S_4$. When a duration equal to the sampling period T is expired, the accumulation values of the signals $S_3$ and $S_4$ are output as input samples of the FFT module 626, and two series of the FFT input samples $S_5$ and $S_6$ are thus obtained and stored in the buffer module 624. The FFT module 626 then respectively performs FFT on the FFT input samples $S_5$ and $S_6$ to obtain two sets of FFT values $S_7$ and $S_8$ respectively corresponding to the signals $S_3$ and $S_4$. The coherent memory 627 is used to store the coherent accumulated FFT values, which are complex numbers. For example, a coherent accumulation period of longer than 20 ms can be used if the data bit stream is known. The incoherent memory 628 is used to accumulate the magnitude of the FFT values or the coherent memory.

Figure 4A:
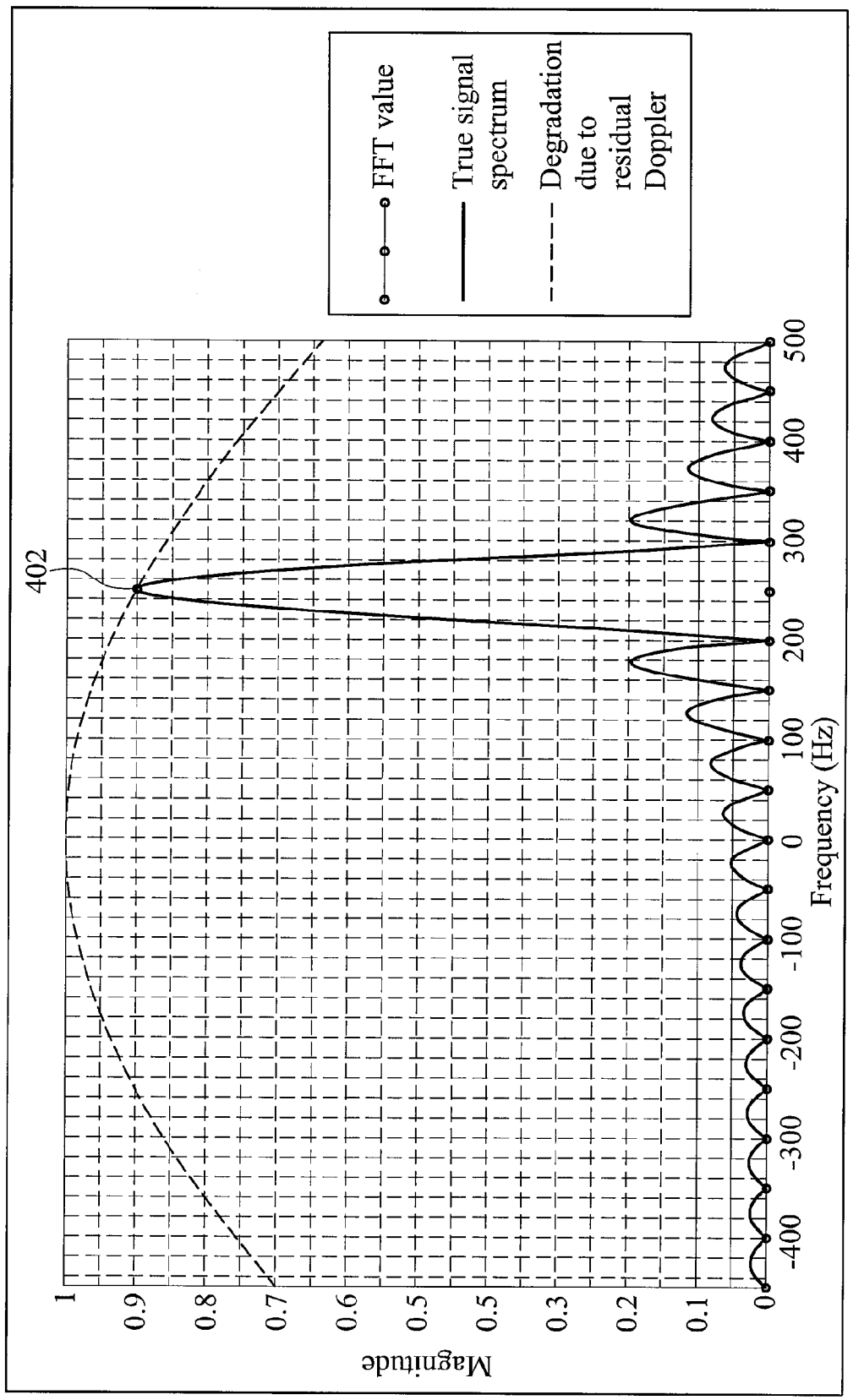
FIG. 4A is a signal spectrum diagram of FFT values for residual Doppler frequency estimation.
Figure 4B:
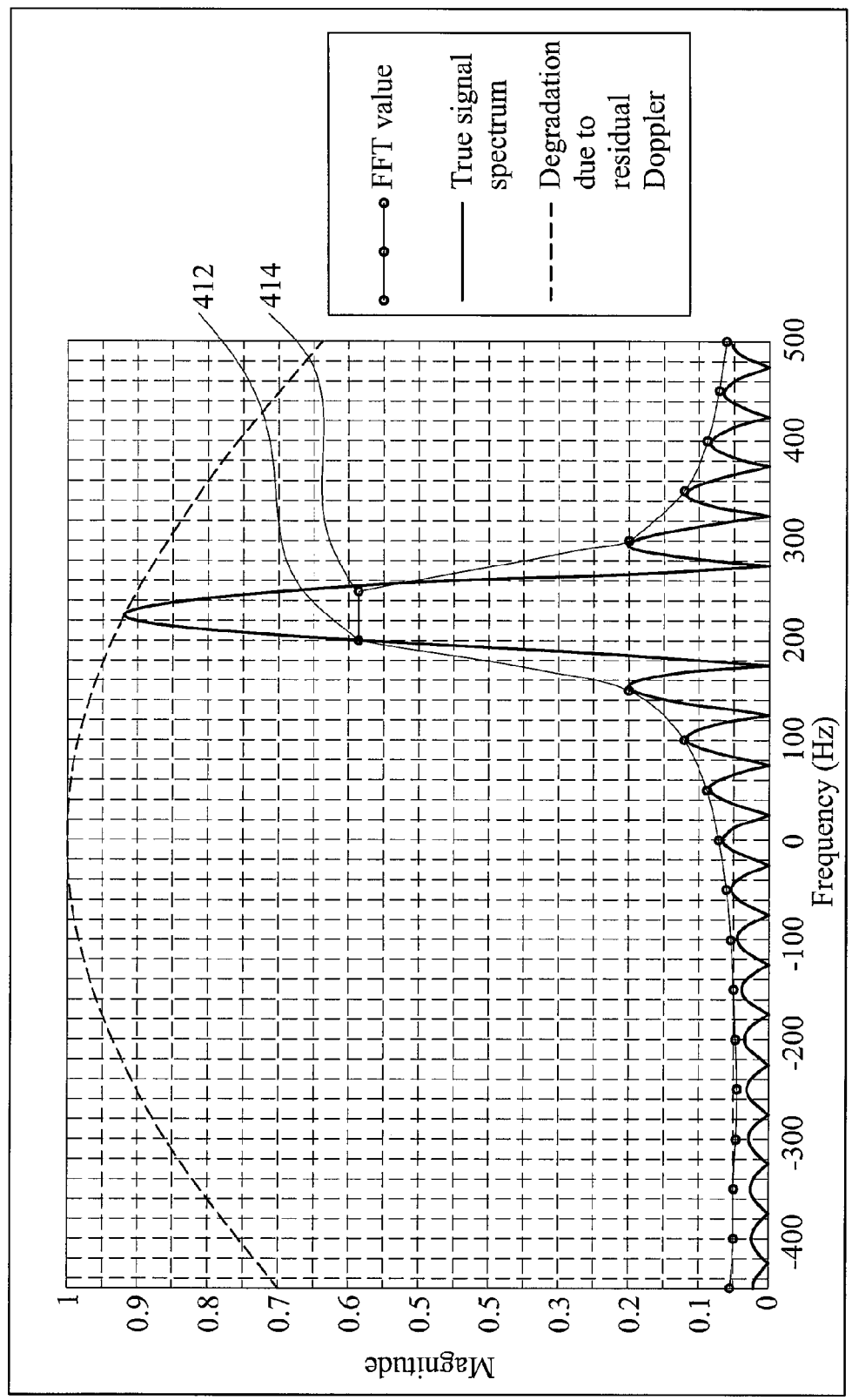
FIG. 4B is a signal spectrum diagram of FFT values corresponding to a scalloping loss situation.
Figure 5:
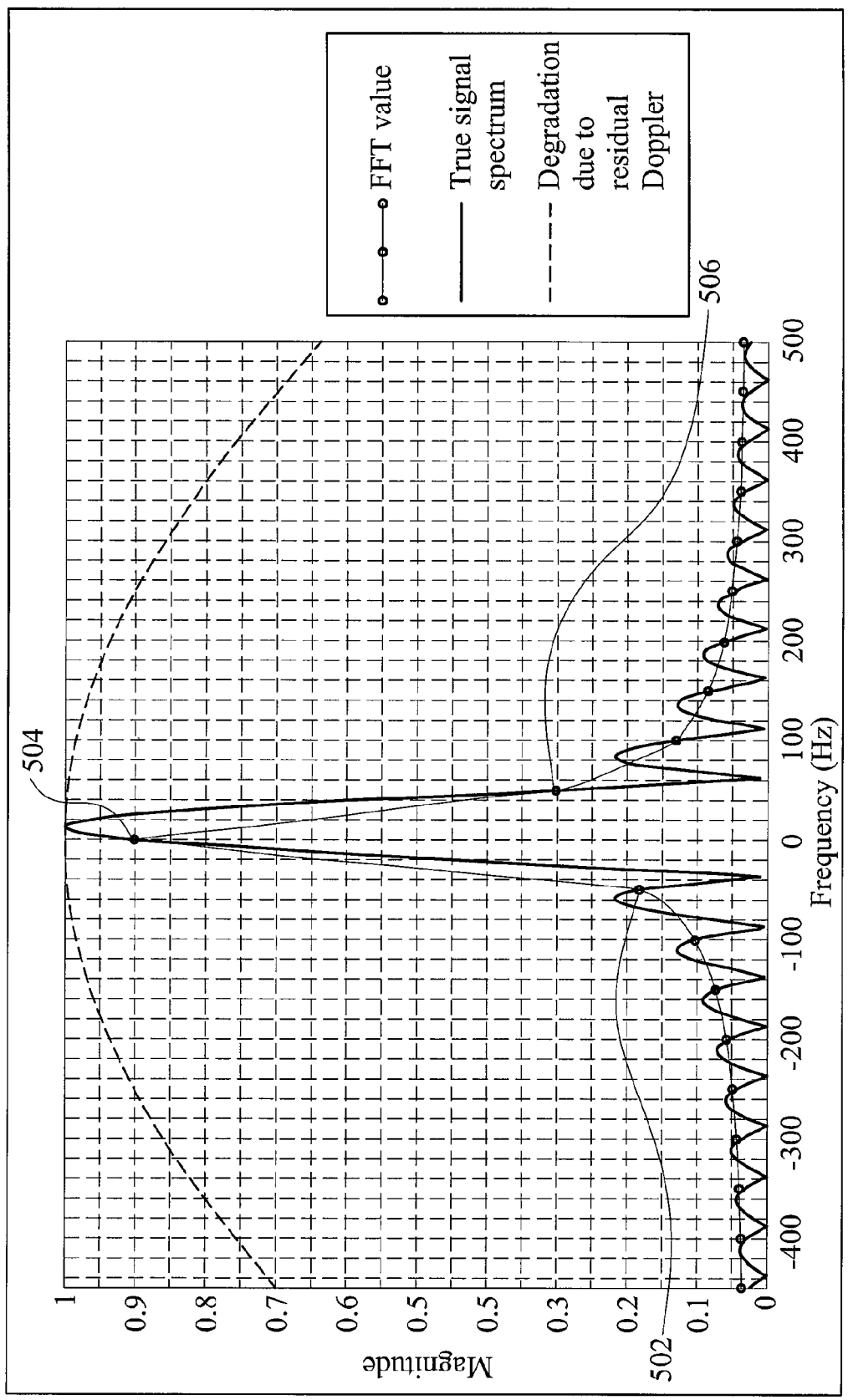
FIG. 5 is a signal spectrum diagram of FFT values for estimating a frequency bias from scalloping loss.
Figure 7:
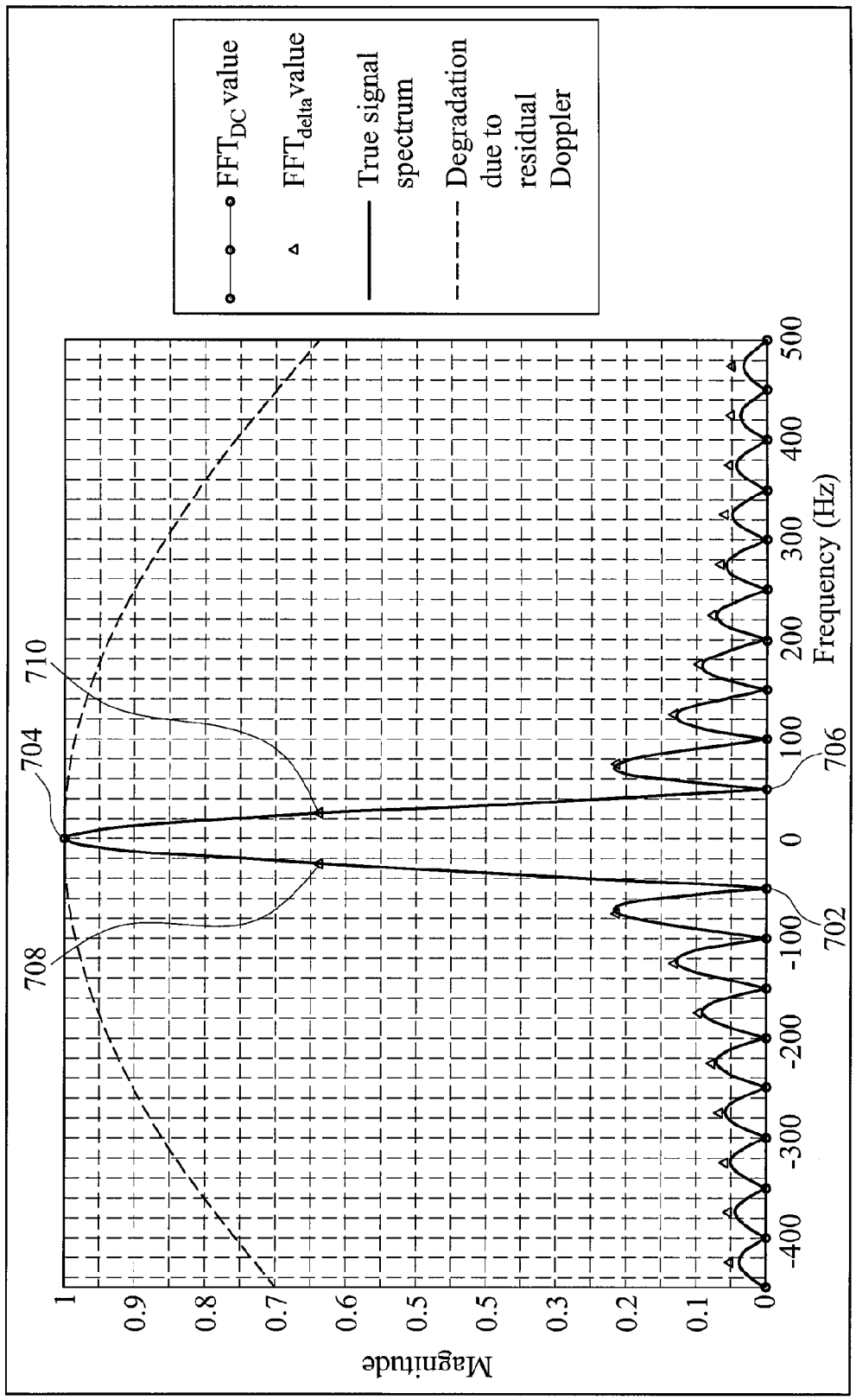
FIG. 7 is a signal spectrum diagram of FFT values for residual Doppler frequency estimation.

The signal processor 620 can then estimate a residual Doppler frequency with improved FFT resolution according to the accumulated magnitude of the FFT values $S_7$ and $S_8$. The signal processor 620 first permutes the FFT values $S_7$ and $S_8$ according to a frequency order thereof to obtain a series of interlaced FFT values. Because the FFT values $S_7$ and $S_8$ are respectively derived from the signals S3 and S4 obtained by removing the carrier signal F and the delta carrier signal F' with a frequency difference of the delta frequency $\Delta f_{carrier}$ therebetween, the FFT values $S_7$ and $S_8$ shown in the same signal spectrum diagram are interlaced with the frequency interval of the delta frequency $\Delta f_{carrier}$. FIG. 7 is a signal spectrum diagram of FFT values for residual Doppler frequency estimation. The FFT values $S_7$ derived from the signal $S_3$ are marked with circles in FIG. 7, and the FFT values $S_8$ derived from the signal $S_4$ are marked with triangles. FIG. 7 clearly shows that the FFT values $S_7$ and $S_8$ are interlaced with a frequency interval of $1/[2 \times (N \times T)]$. Compared with FIGS. 4A, 4B, and 5 in which only one series of FFT values are shown with a frequency resolution of $1/[(N \times T)]$, the frequency resolution of the interlaced FFT values is $1/[2 \times (N \times T)]$, significantly improved.

The signal processor 620 can then estimate the residual Doppler frequency according to the interlaced FFT values with higher frequency resolution, further improving precision of the residual Doppler frequency estimation. The signal processor 620 estimates the residual Doppler frequency according to the method in FIGS. 4A, 4B, and 5. The signal processor 620 first selects a peak FFT value 704 with a maximum magnitude from the interlaced FFT values. Because the magnitude difference between the left FFT value 708 and the right FFT value 710 is zero, there is no frequency bias from scalloping loss, and the frequency 0 Hz corresponding to the peak FFT value 704 directly determines the residual Doppler frequency. After the residual Doppler frequency of 0 Hz is determined, the signal processor 620 adjusts the estimated carrier frequency $f_{carrier}$ according to the estimated residual Doppler frequency. The carrier NCO 618 of the carrier removal module 610 can then generate a carrier signal with precise carrier frequency, and there is no residual Doppler effect causing distortion of signal $S_3$. Thus, the signal processor 620 can implement precise data extraction according to a signal without residual Doppler effects.

Figure 8:
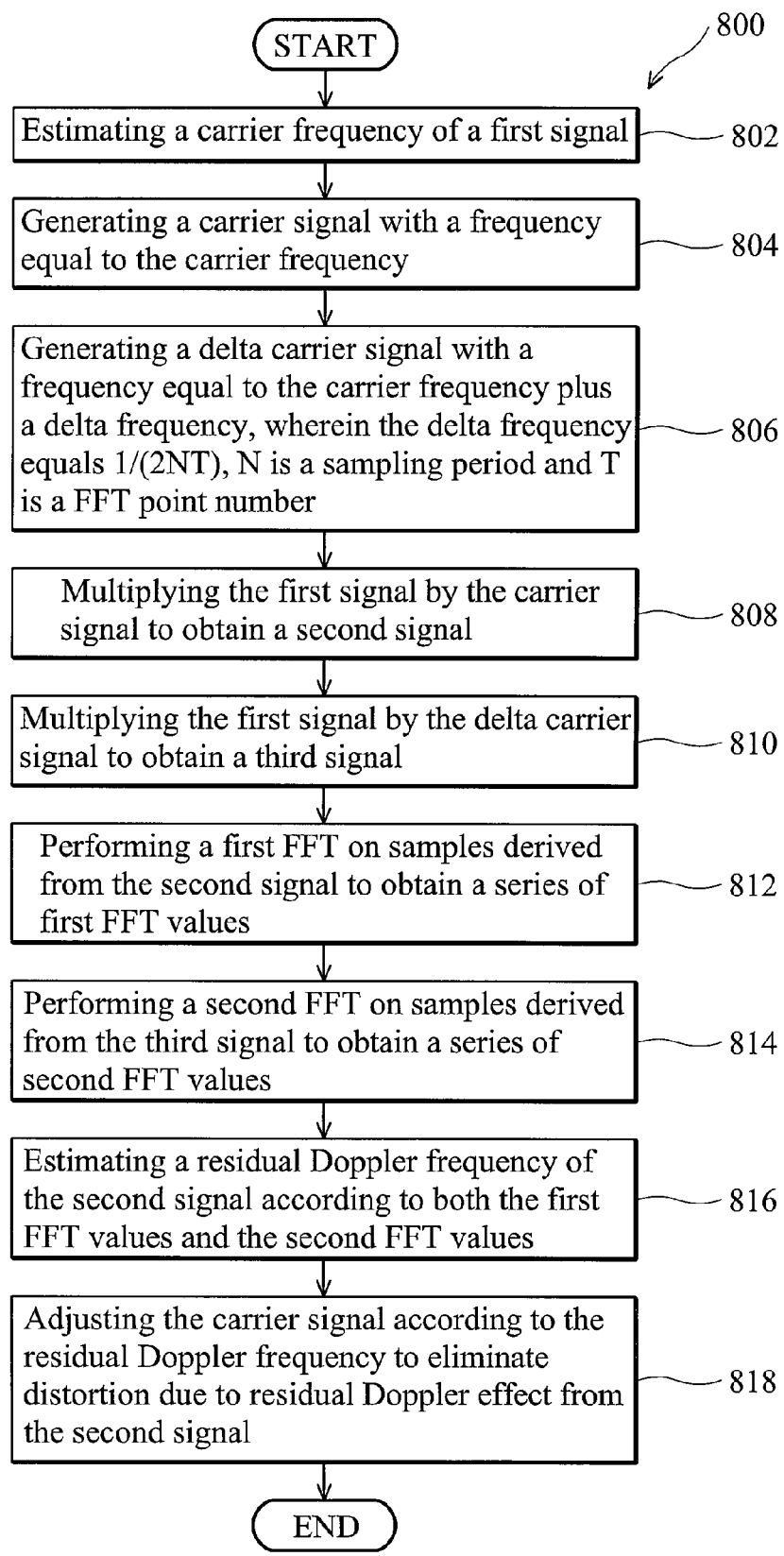
FIG. 8 is a flowchart of a method for estimating a residual Doppler frequency with high FFT resolution in a signal receiver according to the invention.

FIG. 8 is a flowchart of a method 800 for estimating a residual Doppler frequency with high FFT resolution in a signal receiver according to the invention. First, a carrier frequency of a first signal is estimated in step 802. A carrier signal with a frequency equal to the carrier frequency is then generated in step 804. A delta carrier signal with a frequency equal to the carrier frequency plus a delta frequency is then generated in step 806, wherein the delta frequency is lower than a frequency resolution of a first FFT and a second FFT. The first signal is then multiplied by the carrier signal to obtain a second signal in step 808. The first signal is also multiplied by the delta carrier signal to obtain a third signal in step 810. A first FFT is then performed on samples derived from the second signal to obtain a series of first FFT values in step 812. A second FFT is then performed on samples derived from the third signal to obtain a series of second FFT values in step 814. A residual Doppler frequency is then estimated according to both the first FFT values and the second FFT values in step 816. Finally, the carrier signal is adjusted according to the residual Doppler frequency in step 818 to eliminate distortion from residual Doppler effect from the second signal.

The invention provides a signal receiver estimating a residual Doppler frequency with high FFT resolution. Two carrier signals respectively with the frequencies of a carrier frequency and the carrier frequency plus a delta frequency are generated, wherein the delta frequency is less than a frequency resolution of a FFT module. The two carrier signals are then respectively removed from a received signal to obtain two FFT input signals. The FFT module then performs FFT on both the two FFT input signals to obtain two series of FFT values, which are arranged in frequency order to obtain a series of interlaced FFT values with improved FFT resolution. A residual Doppler frequency can then be precisely estimated according to the interlaced FFT values. Because FFT resolution is improved, estimation errors from scalloping loss are reduced. The improved frequency resolution also improves precision of frequency jump, multi-path effect, and signal jamming detection.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A signal receiver, comprising:
   a code removal module, removing a pseudo random noise code from a first signal to obtain a second signal;
   a carrier removal module, coupled to the code removal module, generating a carrier signal with a frequency of an estimated carrier frequency, generating at least one delta carrier signal with a frequency of the estimated carrier frequency plus a delta frequency, removing the carrier signal from the second signal to obtain a third signal, and removing the delta carrier signal from the second signal to obtain a fourth signal;
   a Fast Fourier Transformation (FFT) module, coupled to the carrier removal module, deriving a series of first FFT values from the third signal, and deriving a series of second FFT values from the fourth signal;
   a signal processor, coupled to the carrier removal module and the FFT module, estimating the carrier frequency of the second signal to obtain the estimated carrier frequency, determining the delta frequency for the carrier removal module, estimating a residual Doppler frequency of the third signal according to both the first FFT values and the second FFT values, and adjusting the estimated carrier frequency according to the residual Doppler frequency to eliminate distortion from residual Doppler effects from the third signal;
   wherein the delta frequency is lower than a frequency resolution of the FFT module.

2. The signal receiver as claimed in claim 1, wherein the frequency resolution of the FFT module is $1/(N \times T)$, wherein N is a FFT point number of the FFT module, and T is a sampling period of the FFT module.

3. The signal receiver as claimed in claim 2, wherein the delta frequency equals $J/[(k+1) \times (N \times T)]$, wherein k is a number of the delta carrier signal and is greater than or equal to 1, and J is an index of the delta carrier signal and ranges from 1 to k.

4. The signal receiver as claimed in claim 1, wherein the code removal module comprises:
   a code generator, generating the pseudo random noise code; and
   a correlation module, coupled to the code generator, correlating the first signal with the pseudo random noise code to obtain the second signal.

5. The signal receiver as claimed in claim 1, wherein the carrier removal module comprises:
   a carrier generator, generating the carrier signal according to the estimated carrier frequency;
   a delta carrier generator, generating the delta carrier signal according to the delta frequency;
   a first multiplier, coupled to the carrier generator, multiplying the second signal by the carrier signal to obtain the third signal; and
   a second multiplier, coupled to the delta carrier generator, multiplying the second signal by the delta carrier signal to obtain the fourth signal.

6. The signal receiver as claimed in claim 1, wherein a series of first FFT input samples with the sampling period are derived from the third signal, a series of second FFT input samples with the sampling period are derived from the fourth signal, and the FFT module then performs a FFT with the FFT point number on the first FFT input samples to obtain the first FFT values and performs a FFT with the FFT point number on the second FFT input samples to obtain the second FFT values.

7. The signal receiver as claimed in claim 6, wherein the signal receiver further comprises:
   a summation module, coupled between the carrier removal module and the FFT module, repeatedly summing samples of the third signal for the duration equal to the sampling period to obtain a series of the first FFT input samples, and repeatedly summing samples of the fourth signal for the duration equal to the sampling period to obtain a series of the second FFT input samples; and
   a buffer module, coupled between the summation module and the FFT module, temporarily holding the first FFT input samples and the second FFT input samples.

8. The signal receiver as claimed in claim 6, wherein the signal receiver further comprises:
   an integration and dump module, coupled between the carrier removal module and the FFT module, repeatedly integrating the third signal for the duration of the sampling period to obtain a series of the first FFT input samples, and repeatedly integrating the fourth signal for the duration of the sampling period to obtain a series of the second FFT input samples; and
   a buffer module, coupled between the integration and dump module and the FFT module, temporarily holding the first FFT input samples and the second FFT input samples.

9. The signal receiver as claimed in claim 1, wherein the signal processor permutes the first FFT values and the second FFT values according to a frequency order thereof to obtain a series of interlaced FFT values with a high FFT frequency resolution, selects a peak FFT value with a maximum magnitude from the interlaced FFT values, and estimates the residual Doppler frequency according to the frequency of the peak FFT value, thus the residual Doppler frequency is estimated.

10. The signal receiver as claimed in claim 9, wherein the signal processor further selects three adjacent FFT values with maximum magnitudes, including a left FFT value with a lower frequency, the peak FFT value with a middle frequency, and a right FFT value with a higher frequency, from the interlaced FFT values, and the signal processor then estimates a frequency bias due to scalloping loss according to a magnitude difference between the right FFT value and the left FFT value, and then adds the frequency bias to the middle frequency of the peak FFT value to obtain the residual Doppler frequency, thereby estimating the residual Doppler frequency.

11. The signal receiver as claimed in claim 9, wherein the signal processor interlaces the first FFT values and the second FFT values to form the interlaced FFT values, thereby increasing a FFT frequency resolution of the interlaced FFT values.

12. The signal receiver as claimed in claim 1, wherein the signal processor determines a plurality of delta frequencies with different values for the carrier removal module, the carrier removal module generates a plurality of delta carrier signals according to the delta frequencies and removes the delta carrier signals from the second signal to obtain a plurality of fourth signals, the FFT module derives a plurality of series of second FFT values from the fourth signals, and the signal processor estimates the residual Doppler frequency according to the first FFT values and the plurality of second FFT values.

13. A method for estimating a residual Doppler frequency in a signal receiver, comprising:
    removing a pseudo random noise code from a first signal received by the signal receiver to obtain a second signal;
    estimating a carrier frequency of the second signal to obtain an estimated carrier frequency;
    determining at least one delta frequency;
    generating a carrier signal with a frequency of the estimated carrier frequency;
    generating at least one delta carrier signal with a frequency of the estimated carrier frequency plus the delta frequency;
    removing the carrier signal from the second signal to obtain a third signal;
    removing the delta carrier signal from the second signal to obtain a fourth signal;
    performing a first FFT to derive a series of first FFT values from the third signal;
    performing a second FFT to derive a series of second FFT values from the fourth signal;
    estimating a residual Doppler frequency of the third signal according to both the first FFT values and the second FFT values; and
    adjusting the estimated carrier frequency according to the residual Doppler frequency to eliminate distortion from residual Doppler effects from the third signal;
    wherein frequency resolution of the first FFT and the second FFT is the same, and the delta frequency is lower than the frequency resolution of the first FFT and the second FFT.

14. The method as claimed in claim 13, wherein an FFT module of the signal receiver performs the first FFT and the second FFT, and the frequency resolution of the first FFT and the second FFT is 1/(N×T), wherein N is a FFT point number of the FFT module, and T is a sampling period of the FFT module.

15. The method as claimed in claim 14, wherein the delta frequency equals J/[(k+1)×(N×T)], wherein k is a number of the delta carrier signal and is greater than or equal to 1, and J is an index of the delta carrier signal and ranges from 1 to (k+1).

16. The method as claimed in claim 14, wherein the performance of the first FFT comprises:
    deriving a series of first FFT input samples with the sampling period from the third signal; and
    performing the first FFT with the FFT point number on the first FFT input samples to obtain the first FFT values;
    and the performance of the second FFT comprises:
    deriving a series of second FFT input samples with the sampling period from the fourth signal; and
    performing the second FFT with the FFT point number on the second FFT input samples to obtain the second FFT values.

17. The method as claimed in claim 16, wherein the first FFT input samples are obtained by repeatedly summing samples of the third signal for the duration equal to the sampling period, and the second FFT input samples are obtained by repeatedly summing samples of the fourth signal for the duration equal to the sampling period.

18. The method as claimed in claim 16, wherein the first FFT input samples are obtained by repeatedly integrating the third signal for the duration of the sampling period, and the second FFT input samples are obtained by repeatedly integrating the fourth signal for the duration of the sampling period.

19. The method as claimed in claim 13, wherein the removal of the pseudo random noise code comprises:
    generating the pseudo random noise code; and
    correlating the first signal with the pseudo random noise code to obtain the second signal.

20. The method as claimed in claim 13, wherein the removal of the carrier signal comprises multiplying the second signal by the carrier signal to obtain the third signal, and the removal of the delta carrier signal comprises multiplying the second signal by the delta carrier signal to obtain the fourth signal.

21. The method as claimed in claim 13, wherein the estimation of the residual Doppler frequency comprises:
    permuting the first FFT values and the second FFT values according to a frequency order thereof to obtain a series of interlaced FFT values with a high FFT frequency resolution;
    selecting a peak FFT value with a maximum magnitude from the interlaced FFT values; and
    estimating the residual Doppler frequency according to the frequency of the peak FFT value.

22. The method as claimed in claim 21, wherein the estimation of the residual Doppler frequency further comprises:
    selecting three adjacent FFT values with maximum magnitudes, including a left FFT value with a lower frequency, the peak FFT value with a middle frequency, and a right FFT value with a higher frequency, from the interlaced FFT values;
    estimating a frequency bias from scalloping loss according to a magnitude difference between the right FFT value and the left FFT value; and
    adding the frequency bias to the middle frequency of the peak FFT value to obtain the residual Doppler frequency.

23. The method as claimed in claim 21, wherein the permutation of the first FFT values and the second FFT values is achieved by interlacing the first FFT values and the second FFT values to form the interlaced FFT values, thereby increasing a FFT frequency resolution of the interlaced FFT values.

* * * * *